US007784488B2

(12) United States Patent
Holder et al.

(10) Patent No.: US 7,784,488 B2
(45) Date of Patent: Aug. 31, 2010

(54) VALVE FOR ALLOCATING AVAILABLE FLUID TO HIGH PRIORITY FUNCTIONS OF A HYDRAULIC SYSTEM

(75) Inventors: Robert Edward Holder, Los Angeles, CA (US); Javed Qasim, Diamond Bar, CA (US)

(73) Assignee: Eaton Corporation, Cleveland, OH (US)

( * ) Notice: Subject to any disclaimer, the term of this patent is extended or adjusted under 35 U.S.C. 154(b) by 509 days.

(21) Appl. No.: 11/773,284

(22) Filed: Jul. 3, 2007

(65) Prior Publication Data

US 2009/0007974 A1 Jan. 8, 2009

(51) Int. Cl.
*F16K 31/12* (2006.01)
*F16K 31/36* (2006.01)

(52) U.S. Cl. ...................................... 137/488; 137/485

(58) Field of Classification Search ............ 137/118.01, 137/595, 625, 625.48, 625.49, 485, 488, 137/489.5, 490; 251/28, 282

See application file for complete search history.

(56) References Cited

U.S. PATENT DOCUMENTS 2,744,538 A * 5/1956 Stevenson .................. 137/490
2,968,464 A * 1/1961 Olson ...................... 251/30.04
3,125,319 A * 3/1964 Arbogast et al. .............. 251/29
3,612,476 A * 10/1971 Leitgeb ...................... 251/38
4,630,640 A * 12/1986 DiBartolo ................... 137/501
4,746,093 A * 5/1988 Scanderbeg .............. 251/30.04
4,779,837 A 10/1988 Mito et al.
4,942,900 A * 7/1990 Nozawa et al. .............. 137/490
5,007,458 A * 4/1991 Marcus et al. ........... 137/625.5
5,564,674 A 10/1996 Kalin et al.
5,878,647 A * 3/1999 Wilke et al. .................... 91/445
7,401,751 B2 * 7/2008 Holder .................... 244/129.5

FOREIGN PATENT DOCUMENTS

EP 0 900 962 A2 10/1999

* cited by examiner

*Primary Examiner*—John K Fristoe, Jr.
(74) *Attorney, Agent, or Firm*—Quarles & Brady LLP; George E. Haas

(57) ABSTRACT

A hydraulic system has high priority hydraulic functions connected to a primary supply line that receives pressurized fluid from a source and low priority hydraulic functions connected to secondary supply line. A priority valve couples the primary supply line to the secondary supply line. The priority valve detects when the source is unable to furnish enough pressurized fluid to satisfy the demands of all the high and low priority hydraulic functions. In that case the priority valve reduces or eliminates fluid flow between the primary and secondary supply lines.

23 Claims, 3 Drawing Sheets

VALVE FOR ALLOCATING AVAILABLE FLUID TO HIGH PRIORITY FUNCTIONS OF A HYDRAULIC SYSTEM

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a hydraulic system in which pressurized fluid from a source is applied in a controlled manner to a plurality of hydraulic actuators that produce movement of different components on a machine, and in particular to devices that determine which of the hydraulic actuators are to be operable when insufficient fluid is available from the source to operate all the hydraulic actuators.

2. Description of the Related Art

Modern aircraft employ hydraulic systems to operate various mechanical components, such as ailerons, elevators and the rudder which are parts of the flight control system, as well as doors and landing gear. One or more hydraulic pumps furnish pressurized fluid to a plurality of valve assemblies, each controlling the application of the pressurized fluid to a hydraulic actuator that moves a component on the aircraft. A given valve may be mechanically operated by a member of the flight crew or may be electrically operated either by a crew member or by an electronic controller.

Normally, the pumps furnish sufficient hydraulic fluid so that as many of the hydraulic actuators can be operated simultaneously as is necessary. However, conditions occur in which the pumps are incapable of furnishing enough hydraulic fluid to operate all the desired actuators at the same time. At those times, it is desirable that the hydraulic actuators associated with flight control be able to operate as normally as possible. Therefore, when a limited amount of hydraulic fluid is available, that fluid should be allocated to the flight controls on a priority basis before being made available to less critical functions.

For that purpose, a priority control valve was incorporated in the hydraulic system to enable flight control actuators to operate as normally as possible, while limiting fluid flow to other less critical hydraulic actuators. Prior priority control valves sometimes exhibited an adverse condition commonly called "thrashing." That condition occurred when the priority control valve attempted to close in response to the flow to the secondary actuators that caused a reduction in pressure to the primary actuators. The closing action resulted in an increase of the pressure for the flight control actuators to which the priority control valve reacted by attempting to reopen. It is possible for the response time of the hydraulic system to be such that this open-close-open cycle became a continuous, resonant cycling that was harmful to the system.

As a consequence, it is desirable to provide a device that automatically recognizes when insufficient hydraulic fluid is available for operating all the hydraulic actuators and allocating the available fluid only to high priority actuators. It is further desired to reduce or eliminate the thrashing condition encountered with previous priority control valves.

SUMMARY OF THE INVENTION

A hydraulic system has a plurality of hydraulic functions divided into a primary section and a secondary section. A primary supply line receives pressurized fluid from a source and conveys that fluid to the hydraulic functions in the primary section and a secondary supply line provides pressurized fluid to the hydraulic functions in the secondary section.

A priority valve controls the flow of fluid from the primary supply line to the secondary supply line. The priority valve has a valve bore with a valve seat therein. An inlet port, connected to the primary supply line, communicates with the valve bore on one side of the valve seat. An outlet port is connected to the secondary supply line and is in communication with the valve bore on another side of the valve seat.

A poppet is slideably received in the valve bore thereby defining a control chamber on a side of the poppet remote from the valve seat. Upon sliding in the valve bore, the poppet engages and disengages the valve seat. The poppet includes a spool bore that opens into the control chamber. A first passage provides a conduit for fluid to flow between the inlet port and the spool bore and an end passage creates another conduit for fluid from the inlet port to flow to adjacent the closed end of the spool bore. A second passage extends between the spool bore and the control chamber, while a third passage provides a conduit for fluid to flow between the spool bore and the outlet port.

A control spool is slideably received in the spool bore with a surface exposed to pressure adjacent the closed end of the spool bore. In a first position, the control spool creates a first path between the first and second passages and in a second position a second path is provided between the second and third passages. A spring mechanism, such as one or more springs for example, biases the control spool toward the first position.

When pressure at the inlet port is below a predefined level, the spring mechanism holds the control spool in the first position which keeps the poppet against the valve seat and the priority valve closed. When sufficient fluid becomes available for powering all the hydraulic functions, pressure at the inlet port increases above the predefined level. That pressure is conveyed adjacent the closed end of the spool bore which creates a force that moves the control spool into the second position. In this state, pressure in the control chamber is relieved through the third passage to the outlet port enabling the inlet port pressure to drive the poppet away from the valve seat to open the priority valve. Thereafter, if an inadequate amount of fluid becomes available, the inlet port decreases below the predefined level causing the control spool to return to the first position. This results in the poppet moving back against the valve seat closing the priority valve.

DETAILED DESCRIPTION OF THE INVENTION

Although the present invention is being described in the context of a hydraulic system for an aircraft, it can be implemented on other types of hydraulically operated equipment where certain hydraulic functions have a higher operational priority than other functions.

Figure 1:
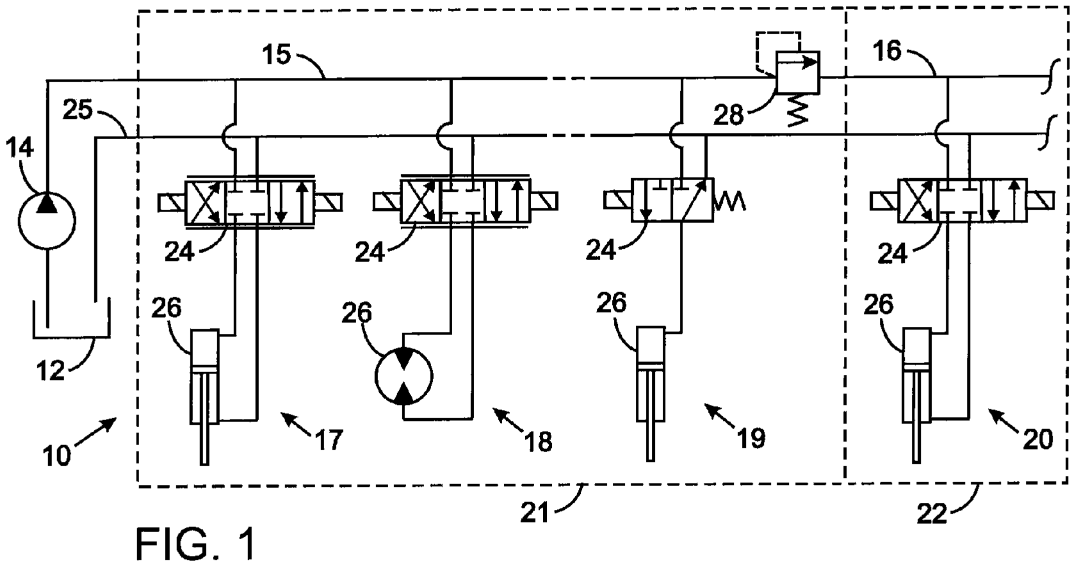
FIG. 1 is a diagram of a hydraulic system incorporating a priority valve according to the present invention.

With initial reference to FIG. 1, a hydraulic system 10 for a machine, such as an aircraft, has a reservoir 12 that holds hydraulic fluid. A pump 14 furnishes that fluid under pressure into a daisy chain of supply lines 15 and 16 connected to a plurality of hydraulic functions 17, 18, 19 and 20. The first three hydraulic functions 17, 18 and 19 are part of a primary section 21 and have a high operational priority functions as compared to the other hydraulic function 20 in a secondary section 22. For example, the hydraulic functions in the primary section 21 relate to the flight controls that are essential for the aircraft to fly, whereas the hydraulic functions in the secondary section 22 are less critical wherein the aircraft is able to fly without those functions being operational. It should be understood that there may be more functions in both the primary and secondary sections 21 and 22 than those illustrated in FIG. 1.

Each hydraulic function 17-20 controls motion of a machine member and comprises a control valve 24 and a hydraulic actuator 26, which may be a cylinder/piston assembly or a hydraulic motor, for example. The control valves 24 govern application of pressurized fluid from the primary supply line 16 to the respective actuator 26 and the return flow of fluid from the actuator to a return line 25 connected to the reservoir 12. The control valves 24 are illustrated as being electrically operated, three-position, four-way spool valves, however manual mechanically operated valves and other types of valves or combinations of valves may be used to control the fluid flow. By selectively operating a control valve 24 into different positions, the direction and speed of the associated actuator 26 is variably controlled.

The hydraulic system 10 incorporates a unique priority valve 28 which interfaces the primary supply line 15 in the primary section 21 to the secondary supply line 16 in the secondary section 22 and controls the fluid flow there between. When the pump 14 is unable to furnish sufficient fluid to adequately power all the functions 17-20, the priority valve 28 limits the flow of fluid to the low priority functions in the secondary section 22 to the extent necessary to enable the high priority functions primary section 21 to operate as fully as possible with the available amount of fluid.

Figure 2:
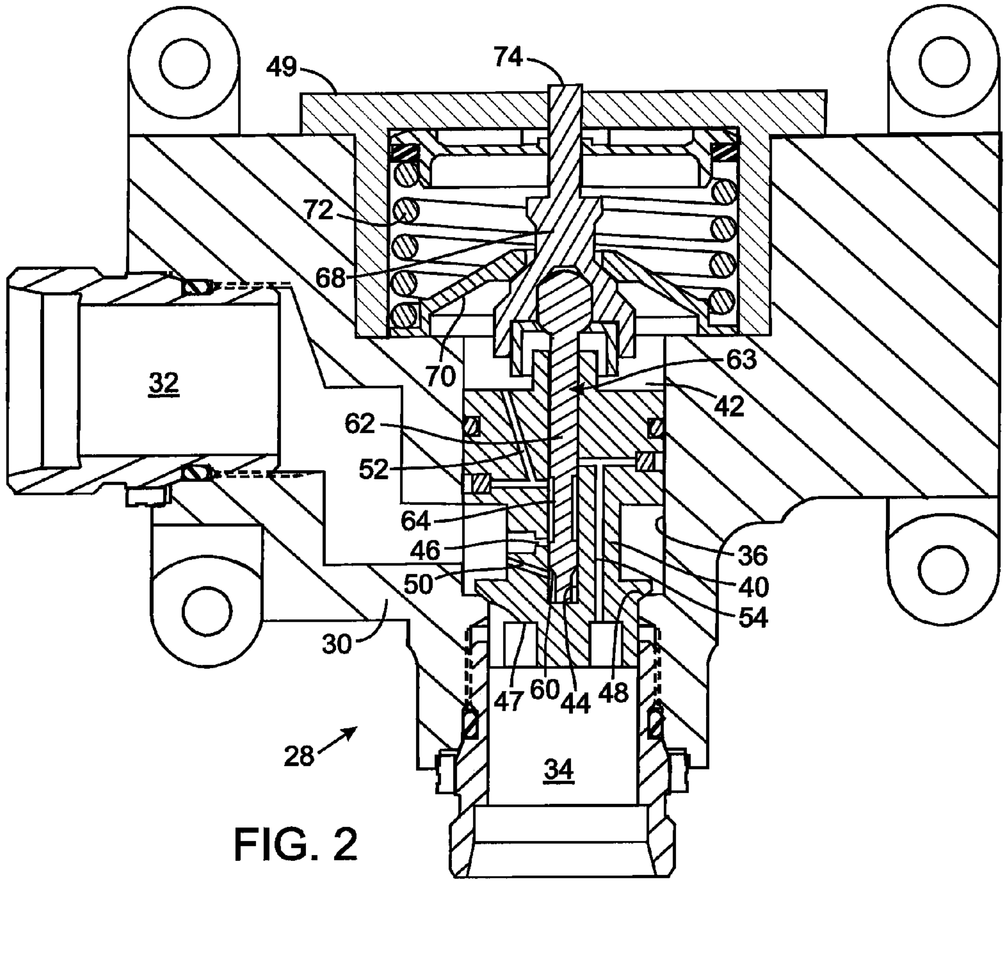
FIG. 2 is a longitudinal cross sectional view through the priority valve in a closed state.

With reference to FIG. 2, the priority valve 28 is a passive device in that it opens and closes in response to pressure levels in the hydraulic system and is not acted on by an electrical actuator, such as a solenoid, or by an external mechanical actuator operated manually or by another mechanism. The priority valve 28 has a body 30 with an inlet port 32 directly connected to the primary supply line 15 and an outlet port 34, directly connected to the secondary supply line 16. The term "directly connected" as used herein means that the associated components are connected together by a conduit or coupling without any intervening element, such as a valve, an orifice or other device, which restricts or controls the flow of fluid beyond the inherent restriction of any conduit. The inlet port 32 opens into a side of a valve bore 36 within the body 30 and the outlet port 34 opens into one end of that bore. A valve seat 48 is formed within the valve bore 36 between the inlet port 32 and the outlet port 34. The end of the valve bore 36 remote from the outlet port 34 is closed by a plug 49 threaded into that bore.

A poppet 40 is slideably received within the valve bore 36 without being biased by spring that acts directly on the poppet. The poppet has a nose 47 that selectively engages the valve seat 48 to open and close fluid communication between the inlet and outlet ports 32 and 34 and thereby control the flow of fluid through the priority valve 28. The pressure at the inlet port 32 thus is applied to the sides of the poppet 40 and the pressure at the outlet port 34 is applied to the nose 47 of the poppet. A control chamber 42 is formed within the valve bore 36 on a remote side of the poppet from the valve seat 48. A spool bore 44 extends part way into the poppet from the control chamber 42. A first passage 46 extends transversely through the poppet 40 from an external location that is in constant communication with the inlet port 32 to an intermediate location along the spool bore 44. An end passage 50 conveys fluid between the inlet port 32 and an opening adjacent the closed end of the spool bore 44. A second passage 52 extends from another intermediate location along the spool bore 44 to the control chamber 42. A third passage 54 extends from the poppet nose 47 on the side facing the outlet port 34 to an opening in the spool bore 44 between the opening of the second passage 52 and the control chamber 42.

A valve spool 62 is slideably received within the spool bore 44 in the poppet 40 and has an interior end that abuts the closed end of the spool bore in the illustrated closed state of the priority valve 28. A portion of the valve spool 62 at the interior end has a reduced diameter providing an end surface 60 on which pressure from the end passage 50 acts even when the spool end abuts the closed end of the spool bore. A second reduced diameter portion is located along the length of the spool forming an annular groove 64. In the closed state of the priority valve 28, the groove 64 provides a first path between the first and second passages 46 and 52, thereby creating a first passageway between the inlet port 32 and the control chamber 42.

The valve spool 62 extends out of the spool bore 44 in the poppet 40 and has an external end that is captured in a recess in a spring shaft 68, which combined function as a control spool 63. This two-piece construction of the valve and control spools 62 and 63 is preferred to reduce friction misalignment. Alternatively for less critical applications, the valve spool 62 and the spring shaft 68 can be integrated as a single piece. The remote upper end 74 of the spring shaft 68 extends through an aperture in the bore plug 49 and is exposed to the ambient pressure outside the priority valve 28. The control spool 63 is passive, meaning that it is not operated by an electrical actuator, such as a solenoid, or by an external mechanical actuator.

The spring shaft 68 projects through a spring retainer 70 that is engaged by one end of a spring 72 which has an second end abutting the bore plug 49. The force of the spring 72 biases the spring shaft 68 and the valve spool 62 toward the poppet 40.

Referring still to FIG. 2, when the hydraulic system 10 starts from rest, the pump 14 had been deactivated and the supply lines 15 and 16 are at the relatively low pressure level of the reservoir 12. As a consequence, the priority valve 28 initially is held in the illustrated closed position shown in FIG. 2 by the force of the spring 72. Specifically, the spring force acting on the spring shaft 68 pushes the control spool 63 inward until abutting the closed end of the spool bore 44. This applies a force that holds the poppet 40 against the valve seat 48. At this time, the spring force is greater than the forces exerted on the valve by pressures from the supply lines 15 and 16 applied to the inlet and outlet ports 32 and 34. In this closed state of the priority valve 28, the poppet groove 64 provides the first path between the first and second passages 46 and 52 which creates a first passageway between the inlet port 32 and the control chamber 42.

As the pump begins operating, pressure in the primary supply line 15 increases, but pressure in the secondary supply line 16 remains at the initial relatively low level, because the priority valve 28 is closed. The primary supply line pressure is applied from the inlet port 32 through the first passageway to the control chamber 42 which further acts to hold the poppet 40 against the valve seat 48. Eventually the primary supply line pressure at the inlet port 32 increases to the point that exerts a force on the interior end surface 60 of the control spool 63 which balances against the opposing force applied by the spring 72. Because the upper end 74 of the control spool 63 extends out of the body 30, it is exposed to the lower ambient pressure at the location of the priority valve 28 in the aircraft. Therefore, pressure in the control chamber 42 does not act on the control spool 63 in a manner that counteracts the pressure at the interior end surface 60. Thus pressure at the closed end of the spool bore 44 that is applied to the lower end of the control spool, essentially acts only against the force of the spring 72.

Figure 3:
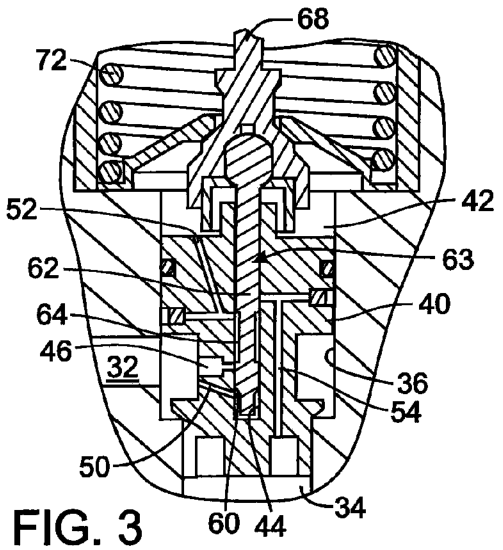
FIGS. 3 through 6 depict the priority valve in sequential stages of opening.

Further pressure increase in the primary supply line 15 moves the control spool 63 relative to the poppet 40 and away from the closed end of the spool bore 44, as shown in FIG. 3. At in this position, the first passage 46 does not open into the annular groove 64 thereby terminating communication of pressure between the first passage 46 and the second passage 52 leading to the control chamber 42. Thus pressure at the inlet port pressure no longer is applied to the control chamber 42 and a constant pressure remains trapped in the control chamber. The trapped pressure in the control chamber 42 holds the poppet 40 against the valve seat 48 keeping the priority valve 28 closed.

Figure 4:
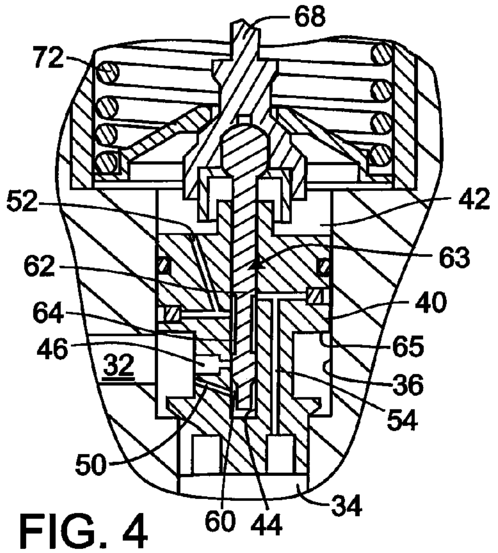

Continued movement causes the control spool 63 to travel far enough to reach the position shown in FIG. 4 at which the upper section of the annular groove 64 opens into the third passage 54 that leads to the outlet port 34. In this position, the second passage 52 still opens into the annular groove 64, thereby providing a second path between the second and third passages 52 and 54. This now provides a second passageway between the control chamber 42 and the outlet port 34.

Figure 5:
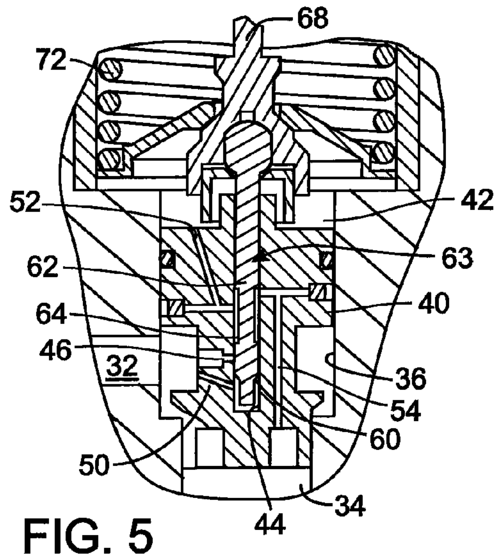

In this state of the priority valve 28, the higher pressure from the primary supply line 15 at the inlet port 32 is cut off from being applied to the control chamber 42. The pressure in the control chamber 42, however, is relieved through the third passage 54, control spool groove 64 and the second passage 52 into the outlet port 34 and the secondary supply line 16. With the control chamber pressure released in this manner, the net force, from the inlet port pressure acting on a poppet shoulder 65, the outlet port pressure acting on the poppet nose 47 and pressure in the control chamber 42, causes the poppet 40 to follow the control spool 63 and move away from the valve seat 48 as shown in FIG. 5. This enables fluid flow between the inlet and outlet ports 32 and 34 and thus from the primary supply line 15 into the secondary supply line 16 in FIG. 1. Therefore, a significant pressure change in the primary supply line 15 must occur before the control spool 63 moves enough distance to open the second passageway between the control chamber 42 and the outlet port 34 and enable the poppet 40 to move away from the valve seat. Therefore minor pressure fluctuations are insufficient to open the priority valve 28.

Figure 6:
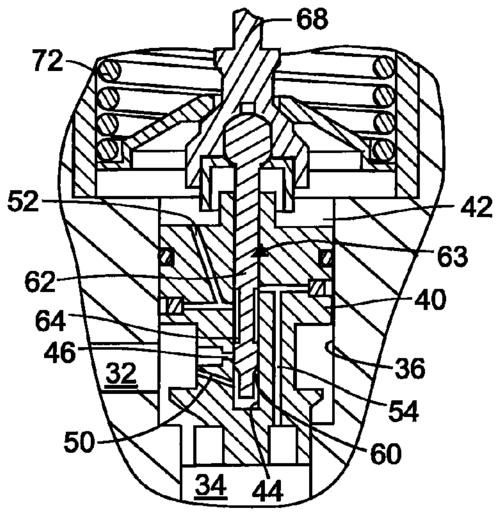

The poppet continues to move away from the valve seat, further enlarging the opening between the inlet and outlet ports 32 and 34, as illustrated in FIG. 6. Increasing pressure continues to move the control spool until it reaches a balanced force intermediate position, as shown in FIG. 6. The poppet follows the control spool until passage 54 is blocked. At this time the passageways to and from the control chamber 42 are closed thereby trapping pressure therein that resists further motion of the poppet 40. Additional pressure increase in the primary supply line 15 as applied to the inlet port 32 may result in the control spool 63 and poppet 40 moving farther upward as a unit against the force of the spring 72.

In this final opened state, the poppet 40 is held open by the equilibrium of forces from the port pressures and the spring 72. The priority valve 28 remains in this stated depicted in FIG. 6 under normal operating conditions of the hydraulic system 10 in which pressurized fluid is supplied to the hydraulic functions in both the primary and secondary sections 21 and 22.

Figure 7:
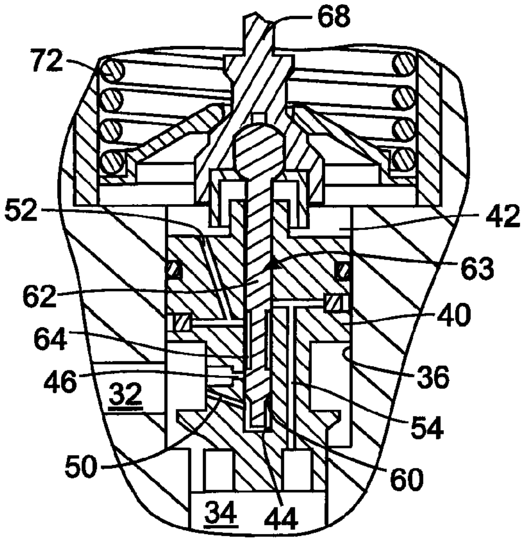
FIGS. 7 through 9 depict the priority valve in sequential stages of closing.

Thereafter, if the pump 14 is incapable of furnishing enough hydraulic fluid to operate all the actuators 26 in the system, the priority valve 28 limits the amount of hydraulic fluid that is made available to the secondary section 22, while allocating as much of the available fluid as is needed to the high priority functions in the primary section 21. Specifically, when the total demand for fluid exceeds the amount available from the pump 14, the priority valve 28 closes to the extent necessary to maintain the pressure in the primary supply line 15 at an optimum level. At that time, pressure in the primary supply line 15 is below a level that keeps the priority valve 28 fully open, so that the force of the spring 72 moves the control spool 63 back into the spool bore 44 in the poppet 40 as shown in FIG. 7. That action moves the upper edge of the control spool groove 64 below the opening of the third passage 54 maintaining closed the second passageway between the control chamber 42 and the outlet port 34. However, the poppet does not move with respect to the valve seat 48.

Figure 8:
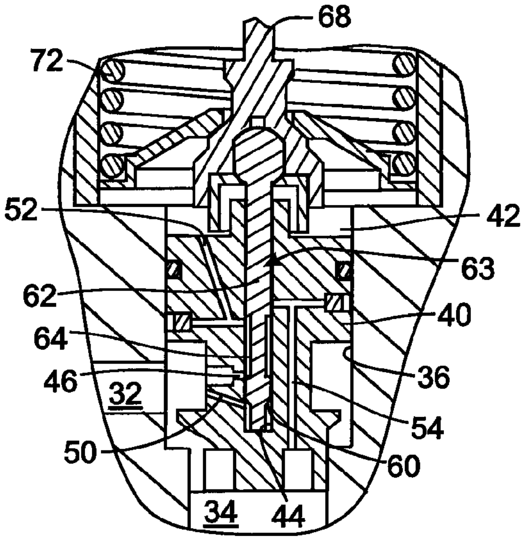
Figure 9:
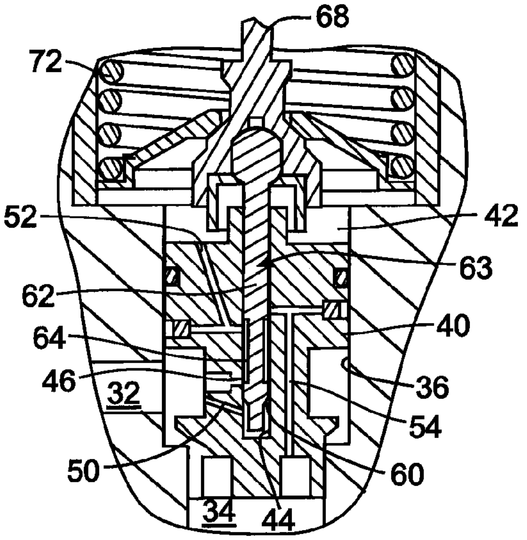

As the inlet pressure continues to decrease, the spring force moves the control spool 63 farther into the spool bore 44 in the poppet 40 as shown in FIG. 8. At this new position, the control spool groove 64 communicates with the first passage 46 and still is aligned with the second passage 52, which again opens the first passageway between the inlet port 32 and the control chamber 42. This results in the greater primary supply line pressure being applied to the control chamber 42 which forces the poppet 40 toward the valve seat 48 reducing the fluid flow through the priority valve 28 to the secondary supply line 16. The poppet 40 assumes a partially closed position illustrated in FIG. 9 at which the amount that the reduction of flow is proportional to the difference between demand for fluid and the amount of fluid available fluid from the pump 14.

If the amount of fluid demanded by the priority hydraulic functions 17-19 in the primary section 21 exceeds the amount of fluid available from the pump 14, the priority valve 28 closes completely returning to the state shown in FIG. 2, where all the available fluid is allocated only to the high priority functions. In order to change the position of the poppet 40 (to close), the control spool 63 must open passage 46. Because of the overlap of the control spool between the first and third passages 46 and 54, a significant pressure change in the primary supply line 15 must occur before the control spool 63 moves enough distance to close the second passageway between the control chamber 42 and the outlet port 34 and enable the poppet 40 to move toward the valve seat. Therefore, minor pressure fluctuations are insufficient to close the priority valve 28.

The poppet 40 and the control spool 63 form a two-stage priority valve 28 that has hysteresis with respect to the pressure levels at which the valve closes and opens. That hysteresis is provided by the control spool 63 having to travel some distance within the spool bore 44 before a new passageway through the poppet 40 is opened to allow the poppet to move. As a result, a significant pressure change must occur in the hydraulic system in order to affect the fluid flow through the priority valve 28, in effect adds damping which eliminate the thrashing cycle encountered with previous priority control techniques. In other words, the present priority valve 28 is resistant to oscillating between open and closed states due to minor pressure fluctuations.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. In a hydraulic system having a plurality of hydraulic functions divided into a primary section and a secondary section with a primary supply line connected to the hydraulic functions in the primary section and a secondary supply line connected to the hydraulic functions in the secondary section, a priority valve comprising:

an inlet port connected to the primary supply line;

an outlet port connected to the secondary supply line;

a valve seat through which fluid flows between the inlet port and the outlet port;

a poppet having a first side and a second side that selectively engages the valve seat in response to pressure acting on the first side, a first passageway for fluid to flow between the inlet port and the first side, a second passageway for fluid to flow between the outlet port and the first side; and a passive control spool selectively opening and closing the first passageway and the second passageway in response to pressure at the inlet port acting on the passive control spool; and a spring that applies force to a first end section of the passive control spool to bias the passive control spool into a first position which opens the first passageway and closes the second passageway, wherein when a force exerted on the passive control spool by pressure at the inlet port is greater than a force from the spring, the passive control spool moves into a second position which closes the first passageway and opens the second passageway.

2. The priority valve as recited in claim 1 wherein:

the poppet has a spool bore, a first passage extending between the inlet port and the spool bore, a second passage extending between the spool bore and the first side, a third passage extending between the outlet port and the spool bore, and an end passage for fluid to flow between the inlet port and a second end of the passive control spool; and the passive control spool is slideably received in the spool bore and has a first position providing a first path between the first and second passages thereby opening the first passageway, and the passive control spool further has a second position providing a second path between the second and third passages thereby opening the second passageway.

3. The priority valve as recited in claim 2 wherein another end of the passive control spool is exposed to ambient pressure outside the priority valve and is acted on only by that ambient pressure.

4. The priority valve as recited in claim 1 further comprising a body defining a valve bore in which the valve seat is formed and in which the poppet slides, and the inlet port and the outlet port communicating with the valve bore.

5. The priority valve as recited in claim 1 wherein the passive control spool exhibits hysteresis between a first pressure level at which the first passageway is opened and a second pressure level at which the second passageway is opened.

6. The priority valve as recited in claim 1 wherein only the spring provides mechanical force that biases the passive control spool toward the first position.

7. In a hydraulic system having a plurality of hydraulic functions divided into a primary section and a secondary section with a primary supply line connected to the hydraulic functions in the primary section and a secondary supply line connected to the hydraulic functions in the secondary section, a priority valve comprising:

a body having a valve bore with a valve seat therein;

an inlet port for connection to the primary supply line and communicating with the valve bore on one side of the valve seat;

an outlet port for connection to the secondary supply line and communicating with the valve bore on another side of the valve seat;

a poppet slideably received in the valve bore and selectively engaging the valve seat thereby defining a control chamber on a side of the poppet remote from the valve seat, the poppet having a spool bore with a closed end, a first passage for fluid to flow between the inlet port and a first location in the spool bore, an end passage for fluid to flow between the inlet port and a second location at the closed end of the spool bore, a second passage extending between a third location in the spool bore and the control chamber, and a third passage for fluid to flow between the outlet port and a fourth location in the spool bore;

a passive control spool slideably received in the spool bore, the passive control spool having a first position in which a first path is provided between the first and second passages, and having a second position in which a second path is provided between the second and third passages; and a spring arrangement that biases the passive control spool toward the first position.

8. The priority valve as recited in claim 7 wherein fluid conveyed by the end passage acts on a surface at one end of the passive control spool.

9. The priority valve as recited in claim 8 wherein another end of the passive control spool has an end surface that is exposed to ambient pressure outside the priority valve.

10. The priority valve as recited in claim 7 wherein the passive control spool exhibits hysteresis between a first pressure level at which the first path is provided and a second pressure level at which the second path is provided.

11. The priority valve as recited in claim 7 wherein the passive control spool has a groove that selectively aligns with the first passage to provide the first path and selectively aligns with the third passage to provide the second path.

12. The priority valve as recited in claim 7 wherein the passive control spool comprises a valve spool slideably received in the spool bore, and a spring shaft biased by the spring arrangement to apply force to the valve spool.

13. The priority valve as recited in claim 7 wherein the poppet has a nose that selectively engages the valve seat and through which the third passage opens.

14. The priority valve as recited in claim 13 wherein the first passage opens through a side surface that extends between two opposite ends of the poppet.

15. The priority valve as recited in claim 7 wherein only the spring arrangement provides mechanical force that biases the passive control spool toward the first position.

16. In a hydraulic system having a plurality of hydraulic functions divided into a primary section and a secondary section with a primary supply line connected to the hydraulic functions in the primary section and a secondary supply line connected to the hydraulic functions in the secondary section, a priority valve comprising:

a valve bore having a valve seat therein;

an inlet port connected to the primary supply line and communicating with the valve bore on one side of the valve seat;

an outlet port connected to the secondary supply line and communicating with the valve bore on another side of the valve seat;

a poppet slideably received in the valve bore and selectively engaging the valve seat thereby defining a control chamber on a side of the poppet remote from the valve seat, the poppet having a spool bore with a closed end and another end opening into the control chamber, a first passage through which fluid may flow between the inlet port and the spool bore, an end passage through which fluid may flow between the inlet port and the closed end of the spool bore, a second passage extending between the spool bore and the control chamber, and a third passage through which fluid may flow between the outlet port and the spool bore;

a passive control spool slideably received in the spool bore, the passive control spool having a first position in which a first path is provided between the first and second passages, a second position in which a second path is provided between the second and third passages; and a spring arrangement that biases the passive control spool toward the first position.

17. The priority valve as recited in claim 16 wherein fluid conveyed by the end passage from the inlet port acts on a surface adjacent one end of the passive control spool.

18. The priority valve as recited in claim 17 wherein another end of the passive control spool is exposed to ambient pressure outside the priority valve.

19. The priority valve as recited in claim 16 wherein the passive control spool has a groove that selectively communicates with the first passage to open the first path and selectively communicates with the third passage to open the second path.

20. The priority valve as recited in claim 16 wherein the passive control spool exhibits hysteresis between a first pressure level at which the first path is opened and a first pressure level at which the second path is opened.

21. The priority valve as recited in claim 16 wherein the poppet has a nose that selectively engages the valve seat and through which the third passage opens.

22. The priority valve as recited in claim 16 wherein the first passage opens through a side surface that extends between two opposite ends of the poppet.

23. The priority valve as recited in claim 16 wherein only the spring arrangement provides mechanical force that biases the passive control spool toward the first position.

* * * * *